United States Patent
Chu et al.

(10) Patent No.: US 12,250,711 B2
(45) Date of Patent: Mar. 11, 2025

(54) HIGH PRIORITY MEDIUM ACCESS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 159 days.

(21) Appl. No.: 17/564,441

(22) Filed: Dec. 29, 2021

(65) Prior Publication Data

US 2022/0240264 A1 Jul. 28, 2022

Related U.S. Application Data

(60) Provisional application No. 63/140,761, filed on Jan. 22, 2021.

(51) Int. Cl.
| | |
|---|---|
| *H04W 72/56* | (2023.01) |
| *H04W 12/06* | (2021.01) |
| *H04W 12/08* | (2021.01) |
| *H04W 28/18* | (2009.01) |
| *H04W 74/0816* | (2024.01) |
| *H04W 84/12* | (2009.01) |

(52) U.S. Cl.
CPC .......... *H04W 72/56* (2023.01); *H04W 12/06* (2013.01); *H04W 12/08* (2013.01); *H04W 28/18* (2013.01); *H04W 74/0816* (2013.01); *H04W 84/12* (2013.01)

(58) Field of Classification Search
CPC .............................. H04W 84/12; H04W 74/04
USPC .......................................................... 370/311
See application file for complete search history.

(56) References Cited

U.S. PATENT DOCUMENTS

| | | | |
|---|---|---|---|
| 11,737,133 B2 | 8/2023 | Chu et al. | |
| 2010/0284380 A1* | 11/2010 | Banerjee | H04W 16/14 455/41.2 |
| 2016/0316397 A1* | 10/2016 | Pantelidou | H04B 1/40 |
| 2019/0274171 A1* | 9/2019 | Viger | H04W 74/02 |

OTHER PUBLICATIONS

Subir Das, et al., "NS/EP Priority Service Capability Information and Indication," Jul. 2020; 13 pages.
Subir Das, et al., "Priority Access Support in IEEE 802.11be: What and Why?" Nov. 2019; 18 pages.

* cited by examiner

*Primary Examiner* — Kiet M Doan

(57) ABSTRACT

Various embodiments relate to an access point (AP) configured to support a high priority (HP) service, including: a transceiver configured to: announce first enhanced distributed channel access (EDCA) parameters for a first device associated with the AP, wherein the first EDCA parameters support the HP service; announce second EDCA parameters for a second device associated with the AP that does not support the HP service; receive a HP priority access request frame from the first device configured to request HP services; determine that the second device supports the HP service through negotiation; and transmit an HP priority access response frame to the first device enabling HP traffic transmission by the first device.

28 Claims, 3 Drawing Sheets

HIGH PRIORITY MEDIUM ACCESS

CROSS-REFERENCE TO RELATED APPLICATIONS

This application claims benefit to U.S. Provisional Patent Application No. 63/140,761 filed on Jan. 22, 2021, the contents of which are hereby incorporated by reference for all purposes as if fully set forth herein.

TECHNICAL FIELD

Various exemplary embodiments disclosed herein relate generally to apparatus and methods of high priority access such as national security and emergency preparedness (NSEP) medium access.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to an access point (AP) configured to support a national security and emergency preparedness (NSEP) service, including: a transceiver configured to: announce first enhanced distributed channel access (EDCA) parameters for a first device associated with the AP, wherein the first EDCA parameters support the NSEP service; announce second EDCA parameters for a second device associated with the AP that does not support the NSEP service; receive a NSEP priority access request frame from the first device configured to request NSEP services; determine that the second device supports the NSEP service through negotiation; and transmit an NSEP priority access response frame to the first device enabling NSEP traffic transmission by the first device.

Various embodiments are described, wherein determining that the first device supports the NSEP service through negotiation includes authenticating the first device's support of NSEP services.

Various embodiments are described, wherein: the first and second EDCA parameters include AIFSN, CWmin, and CWmax values, wherein the AIFSN, CWmin, and CWmax values of the second device are smaller than the AIFS, CWmin, and CWmax values for the third device.

Various embodiments are described, wherein enabling NSEP traffic transmission by the first device is based upon the traffic specification (TSPEC) of a requested NSEP traffic:

Various embodiments are described, wherein TSPEC is carried in a stream classification service (SCS) request/response exchange.

Various embodiments are described, wherein TSPEC is carried in an add traffic stream (ADDTS) request/response exchange.

Various embodiments are described, wherein announcing the first EDCA parameters is done using a broadcast management frame from of the AP.

Various embodiments are described, wherein announcing the first EDCA parameters is done using the management frame for NSEP service enabling negotiation.

Various embodiments are described, wherein the AP and the first device are multi-link devices (MLD) and wherein announcing the first EDCA parameters includes providing different EDCA parameters for each link associated with the first device.

Various embodiments are described, wherein the transmitter is further configured to update the first EDCA parameters for the first device.

Various embodiments are described, wherein the first EDCA parameters includes EDCA parameters for a portion of the traffic IDs (TID)/access categories (AC) associated with the first device.

Various embodiments are described, wherein the first EDCA parameters includes EDCA parameters for all of the traffic IDs (TID)/access categories (AC) associated with the first device, and wherein the first device determines which of the TIDs/ACs associated with the first device use the first EDCA parameters.

Various embodiments are described, wherein the NSEP service is enabled on all of the TIDs of the first device when the NSEP service is enabled for the first device.

Various embodiments are described, wherein the first EDCA parameter set is a multiuser (MU) EDCA parameter set.

Various embodiments are described, wherein the AP and the first device are multi-link devices (MLD) and wherein the MU EDCA parameter set is specified for each link associated with the first device.

Various embodiments are described, wherein the EDCA parameter set only applies to the AC_VI and AC_VO access categories.

Further various embodiments relate to an non-access point (non-AP) device configured to support a national security and emergency preparedness (NSEP) service, including: a transceiver configured to: receive an announcement of first enhanced distributed channel access (EDCA) parameters from an access point (AP), wherein the first EDCA parameters support the NSEP service; receive an announcement of a second enhanced distributed channel access (EDCA) parameters from the AP, wherein the second EDCA parameters do not support the NSEP service; transmit a NSEP priority access request frame to the AP configured to request NSEP services; and receive an NSEP priority access response frame from the AP enabling NSEP traffic transmission by the non-AP device.

Various embodiments are described, wherein: the first and second EDCA parameters include AIFSN, CWmin, and CWmax values, wherein the AIFSN, CWmin, and CWmax values of the second device are smaller than the AIFS, CWmin, and CWmax values for the third device.

Various embodiments are described, wherein enabling NSEP traffic transmission by the non-AP device is based upon the traffic specification (TSPEC) of a requested NSEP traffic:

Various embodiments are described, wherein TSPEC is carried in a stream classification service (SCS) request/response exchange.

Various embodiments are described, wherein TSPEC is carried in an add traffic stream (ADDTS) request/response exchange.

Various embodiments are described, wherein the transceiver is further configured to receive a broadcast management frame from the AP that announced the first EDCA parameters.

Various embodiments are described, wherein announcing the first EDCA parameters is done using the management frame for NSEP service enabling negotiation.

Various embodiments are described, wherein the non-AP device and the AP are multi-link devices (MLD) and wherein announcing the first EDCA parameters includes receiving different EDCA parameters for each link associated with the non-AP device.

Various embodiments are described, wherein the transmitter is further configured to receive an update of the first EDCA parameters from the AP.

Various embodiments are described, wherein the first EDCA parameters includes EDCA parameters for a portion of the traffic IDs (TID)/access categories (AC) associated with the non-AP device.

Various embodiments are described, wherein the first EDCA parameters includes EDCA parameters for all of the traffic IDs (TID)/access categories (AC) associated with the non-AP device, and wherein the transceiver is further configured to determine which of the TIDs/ACs associated with the non-AP device use the first EDCA parameters.

Various embodiments are described, wherein the NSEP service is enabled on all of the TIDs of the non-AP device when the NSEP service is enabled for the non-AP device.

Various embodiments are described, wherein the first EDCA parameter set is a multiuser (MU) EDCA parameter set.

Various embodiments are described, wherein the non-AP device and the AP are multi-link devices (MLD) and wherein the MU EDCA parameter set is specified for each link associated with the non-AP device.

Various embodiments are described, wherein the EDCA parameter set only applies to the AC_VI and AC_VO access categories.

BRIEF DESCRIPTION OF THE DRAWINGS

In order to better understand various exemplary embodiments, reference is made to the accompanying drawings, wherein.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

In the United States, federal agencies such as DHS/ECD (Department of Homeland Security/Emergency Communications Division) have specified priority telecommunications programs that provide national security and emergency preparedness (NSEP) and public safety users the ability to communicate on public telecommunications networks during times of congestion. There is a requirement to use Wi-Fi access networks in scenarios where Wi-Fi access may be the only available access networks such as inside a building, airports, stadiums or places where there is no cellular radio coverage available during a NSEP event. Other countries may also have similar security and emergency communication requirements. The same requirements for high priority access to a network may arise for any service requiring guaranteed quality of service (QoS) especially in congested network, where for example the traffic requires low latency, requires immediate access to the network, and is high priority traffic. Embodiments of a Wi-Fi network will be described that allow for access to a congested network for high priority traffic. While NSEP frames and traffic will be described herein as an example, it is noted that the embodiments herein are applicable to any type of high priority, low latency data frames and traffic that need a guaranteed QoS even when the network is congested.

Figure 1:
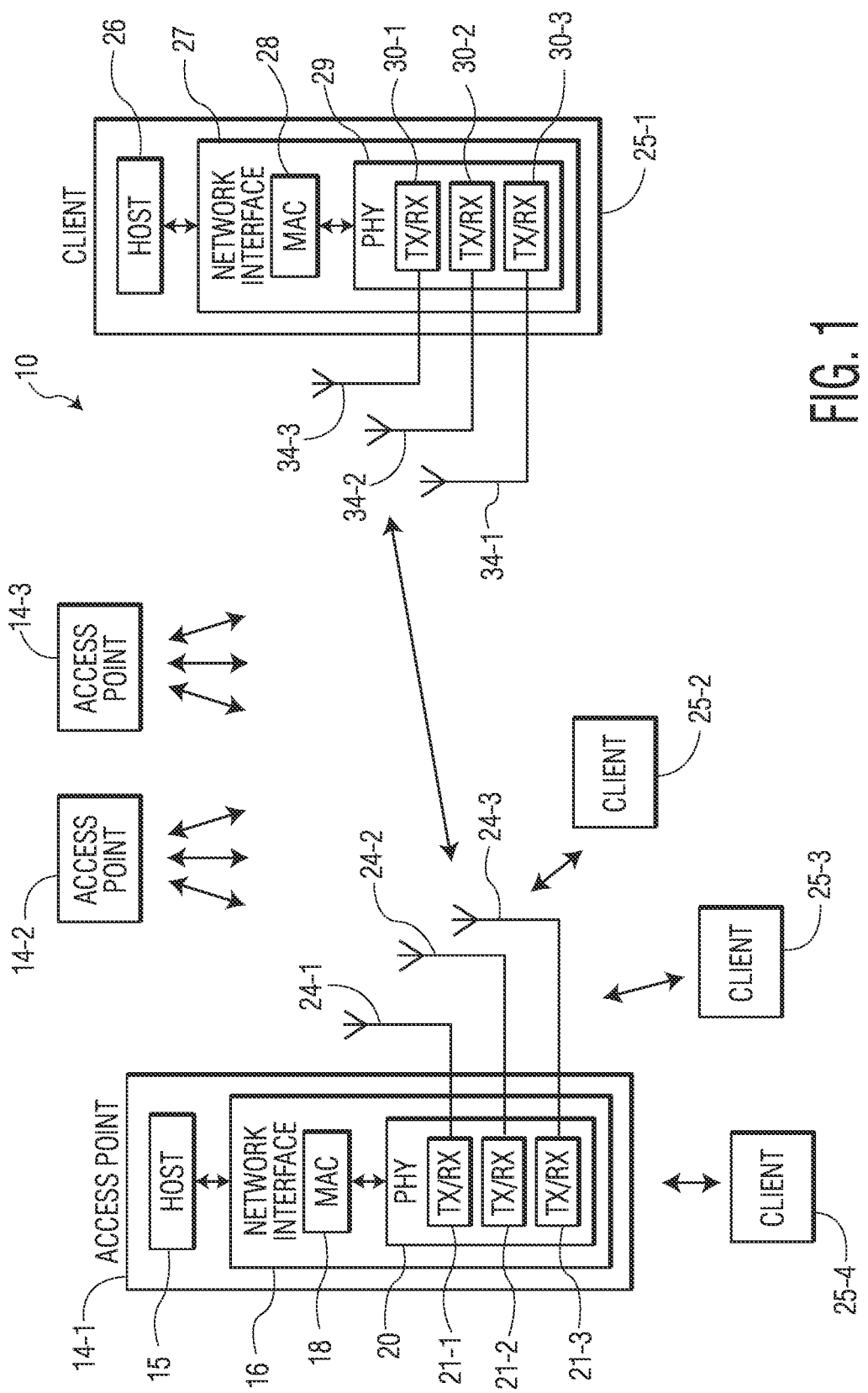
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of an non-AP MLD 25 are configured to receive corresponding data streams that are transmitted simultaneously by the AP 14. Additionally, two or more of the STAs of an non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an non-AP MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to a single user (SU) or multiple users. In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

In EHT, an AP may communication with various STAs having different bandwidths. Beamforming may be used with these various stations. Embodiments of how to perform null data packet (NDP) sounding will be described when the stations have various bandwidths and a wide bandwidth NDP is used for sounding wherein the bandwidth of the wide bandwidth NDP is greater than the bandwidth of some of the stations.

Starting with HE, OFDMA was defined to allow communication with multiple stations having various bandwidths, and with many users this provides many benefits by reducing the overhead required for a transmission to various stations individually. However, for a limited number of users and with dynamic packet lengths, OFDMA may not have benefits over multiple single-user transmissions, considering the traffic dynamics and extra control information that is required for the transmission. For one BSS with STAs that have a mix of operating bandwidths (BW), e.g. 20 MHz, 80 MHz, 160 MHz, or 320 MHz, a transmission to these various different BW STAs may beneficially be carried out using one wide-bandwidth OFDMA. For example, an OFMDA transmission to two 40 MHz STAs and one 80 MHz STA may be carried out using a 160 MHz OFMDA transmission. If the bandwidth required by the STAs is more than available in an OFMDA transmission, then the bandwidth used with each STA may be reduced as needed. Accordingly, each STA may be allocated RUs according to its device bandwidth. With sub-channel selective transmission (SST) enabled small-BW STAs, each small-BW STA can be allocated an RU size equal to its device BW on either primary or secondary sub-channels.

Beamforming may be used with OFDMA to further increase the performance of OFDMA due to increased beamforming gain. As a result, the modulation and coding scheme (MCS) may be enhanced or the range may be extended for each STA.

In MLD operation, simultaneous transmit and receive (STR) operation may be allowed. That is while one link is transmitting another link is receiving. Non-AP MLDs may be STR or non-STR (NSTR).

Priority access support for NSEP priority services is to be included in 802.11be. It is an objective to provide a standardized mechanism to support the NSEP Priority Services in WLANs without requiring additional infrastructure. Priority Access in IEEE 802.11be would also be beneficial to other services (e.g., Public-Safety Mission-Critical Services, Critical medical applications). Further priority access may be provided to system resources for a limited set of authorized users during network congestion. This priority access will allow preferred access to the wireless medium during network congestion and/or failures to establish a data session. Only a limited set of users may be allowed that is a small fraction of the overall user base. This limited set of users will be authorized users who are identified to receive such a service.

NSEP priority services may include the following assumptions and requirements. If the priority access for NSEP priority services is supported in a BSS, the non-AP STA should be able to gather such capability information from an AP STA before association/re-association. If the priority access for NSEP priority services is supported in a non-AP STA, it should be able to provide such capability information to an AP STA. A NSEP priority service user's non-AP STA is associated with BSS prior to invocation of priority capabilities. Further, association and authorization occur via standard procedures. After association, an AP STA has the knowledge of which non-AP STAs are authorized to use NSEP priority services. A NSEP priority service non-AP STA will inform the AP STA regarding the need for priority service. Similarly, an AP can instruct non-AP STA to enable the priority access. The priority access remains in effect until terminated by either party.

Figure 2:
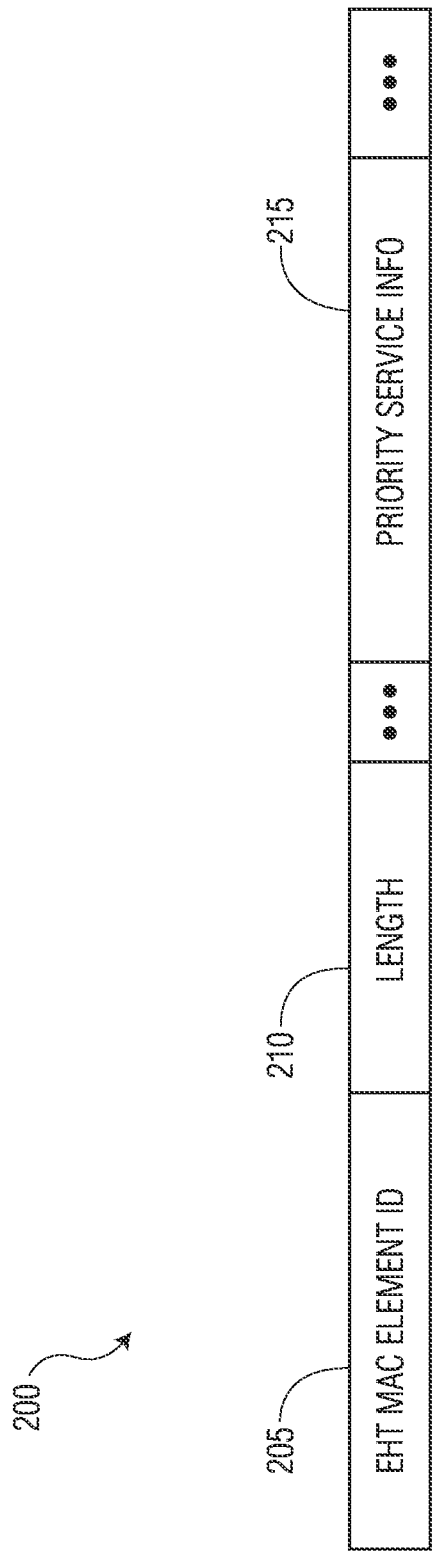
FIG. 2 illustrates an embodiment of the EHT MAC Capability Information Element.

One approach for implementing NSEP priority services may include: adding NSEP priority service capability information in the Multi-Link element or EHT MAC Capability Information Element to announce the capability of supporting NSEP service; and using action frames (request/response) to negotiate the enablement of NSEP priority access. FIG. 2 illustrates an embodiment of the EHT MAC Capability Information Element 200. The EHT MAC Capability Information Element 200 includes an EHT MAC element ID 205, length 210, and Priority Service Info 215. The Priority Service Info 215 may include a parameter dot11PriorityServiceActivated. When dot11PriorityServiceActivated is true, priority channel access for NSEP Priority Service shall be supported. When priority channel access is not supported, dot11PriorityServiceActivated is false. When the IEEE 802.11 infrastructure is informed of the availability of Priority Service, an AP STA with dot11PriorityServiceActivated equal true may advertise the support of the priority channel access by including the Priority Service Information in its Beacon, Probe Response frames, or/and new defined broadcast management (Action)

frames. A non-AP STA with dot11PriorityServiceActivated equal true shall include the Priority Service Information in its Probe Request and (Re) Association Request frames.

NSEP priority access may be indicated using an action frame that may include request and response action frames for enabling/disabling the NSEP priority access. The request action frame may be used to request the enablement/disablement of the priority access, and the response action frame may be used to confirm/provide status of the priority access (e.g. accept).

A non-AP STA may initiate NSEP priority access by sending a NSEP request action frame to an AP STA to enable NSEP priority access. The request may include a field that indicates whether the request is to enable or disable the NSEP priority access. The request is only sent if non-AP STA is associated with an AP. Then the AP STA sends NSEP response action frame to non-AP STA with a status indication (e.g., SUCCESS.)

An AP STA may initiate NSEP priority access by sending a NSEP request action frame to inform a non-AP STA that priority access is being enabled (e.g., start of incoming priority voice call to non-AP STA.) The non-AP STA sends NSEP response action frame to the AP STA to confirm receipt. When priority is no longer needed, either the AP STA or non-AP STA may send a NSEP request action frame to disable the priority access so that all priority features cease. A receipt of request may be confirmed with a response.

During a NSEP Priority Access Request/Response exchange, an associated AP (MLD) that supports the NSEP service authenticates a STA (MLD) that supports NSEP service in order for the STA (MLD) to use the NSEP service. A STA (MLD) that passes the authentication then may request the associated AP (MLD) to enable the NSEP service through the NSEP Priority Access Request/Response exchange. Typically a restricted target wait time (TWT) service period (SP) may be used to transmit NSEP traffic, but this would require the support of a restricted TWT for NSEP traffic, which is considered an undesirable change.

Embodiments of a NSEP Priority Access Request/Response exchange will be described herein that includes the following: priority access of NSEP without the help of restricted TWT SP; and the use of the traffic specification (TSPEC) to help define the NSEP service.

Enhanced Distributed Channel Access (EDCA) is a contention-based access method used in IEEE 802.11. EDCA prioritized medium access using access categories (AC). The four access categories are AC_BK, AC_BE, AC_VI, and AC_VO which correspond to background, best effort, video, and voice traffic categories respectively.

Figure 3:
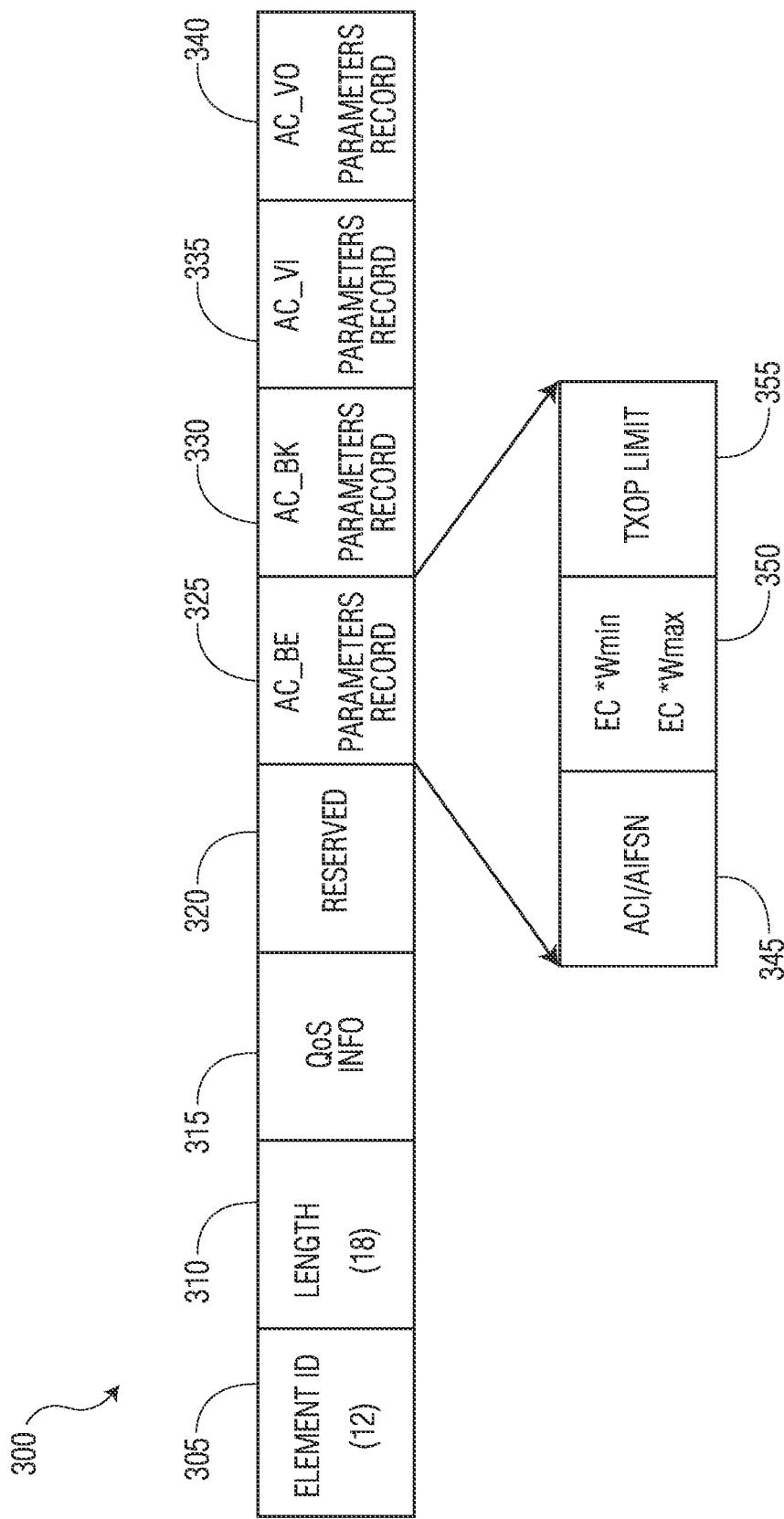
FIG. 3 illustrates the structure of the EDCA parameter set To facilitate understanding, identical reference numerals have been used to designate elements having substantially the same or similar structure and/or substantially the same or similar function.

EDCA defines various parameters that are used for medium access and frame exchanges of traffic with different priorities. FIG. 3 illustrates the structure of the EDCA parameter set 300. The EDCA parameter set 300 include an Element ID 305, length filed 310, QoS Info 315, reserved field 320, AC_BE Parameters record 325, AC_BK Parameters record 330, AC_VI Parameters record 335, and AC_VO Parameters record 340. Each of the AC parameter records includes an ACI/AIFSN field 345, ECWmin/ECWmax field 350, and transmit opportunity (TXOP) limit field 355. The QoS Info field 315 provides various parameters related to QoS.

The ACI/AIFSN filed 345 includes a reserved bit, two bits for the access category indicator (ACI), an admission control mandatory (ACM) bit, and four bits for Arbitrary Inter-Frame Number (AIFSN). The ACI bits specify the specific AC. The ACM bit is set if admission control is required. The AIFSN indicates the number of time slots before the contention window start for each access category.

The ECWmin and ECWmax values are each four bits and are used to calculate the minimum and maximum contention window CWmin and CWmax, respectively. The TXOP limit field 355 provides the amount of time allowed to each AC during a TXOP. Each unit value in the TXOP Limit field is equivalent to 32 micro-seconds.

The CWmin and CWmax values limit the range of backoff values that are used by a device when contending for the medium using the Carrier Sense Multiple Access with Collision Avoidance (CSMA/CA) protocol. The CWmin and CWmax values help to control the traffic's access to the medium and hence affect the QoS of the traffic.

A NSEP STA (MLD) that has NSEP is enabled uses high priority EDCA parameters for NSEP service in a EDCA parameter set element for NSEP, e.g. a newly defined NSEP EDCA parameter set element or EDCA Parameter set element in a management frame unicast to the NSEP STA (MLD). In one embodiment, the format of the NSEP EDCA Parameter Set element is similar to the format of EDCA Parameter Set element. The CWMin, CWmax, and AIFSN of various ACs (AC_VI, AC_VO, AC_BE, AC_BK) for NSEP may be included in a NSEP EDCA parameter set element for NSEP service, e.g., a newly defined NSEP EDCA Parameter Set element or EDCA Parameter set element in a management frame unicast to the NSEP STA (MLD). The EDCA parameters for NESP service are different from and provide a higher priority than the CWMin, CWmax, AIFSN of respective ACs of normal EDCA parameter set in a Beacon frame or Association Response frame (i.e., the EDCA Parameter Set element) for the STAs that does not enable NSEP service. In one alternative embodiment, the EDCA Parameter Set for NSEP service only announces the parameters for AC_VI and AC_VO for NSEP traffic, as such traffic is most likely to be needed during NSEP priority access. It is noted, that with this method, new access categories are not required.

Two different approaches may be used to provide notification of the EDCA parameter set for NSEP. In a first approach, EDCA parameter set element for NSEP is carried in the Beacon frames transmitted by the AP (MLD). While such an approach may provide continuous communication and updates of the EDCA parameter set element for NSEP, it does increase the length of the Beacon frames. In a second approach, the EDCA Parameter Set element for NSEP service is carried in NSEP Priority Access Response/Request from the AP (MLD). When the non-AP STA (MLD) requests NSEP priority access, it sends a NSEP priority access request frame to an AP STA (MLD) to request the enablement of the NSEP priority access. In response, the AP STA (MLD) will reply with the NSEP Priority Access Response that includes the EDCA Parameter Set element for NSEP.

In one embodiment, for different links of a non-AP MLD the EDCA Parameter Sets for NSEP service is provided for each link where different links can have different EDCA parameters for each AC, i.e. the EDCA parameters for NSEP service are not MLD level parameters. An AP MLD may provide NSEP EDCA Parameter Sets with different values in its different links. In one embodiment, the per-link EDCA Parameter Set element for NSEP service is carried in a Multi-Link element with a specific type for NSEP service.

In one embodiment, the update of information in EDCA Parameter Set element for NSEP service is a critical update. The update of the EDCA Parameter Set element for NSEP service may be done using a Beacon frame. In one embodiment, update of the EDCA Parameter Set for NSEP is carried in broadcast Action frame.

Various options of how an AP initiates and specifies the NSEP priority access for various traffic identifiers (TIDs)/ACs will now be described. In a first option, an AP only allows the NSEP service for selected TIDs/ACs. The other TIDs/ACs will use the backoff parameters of the normal EDCA parameter set. In another embodiment, the EDCA Parameter Set for NSEP service includes the EDCA parameters for only some TIDs/ACs. In another embodiment, the EDCA Parameter Set for NSEP service includes the EDCA parameters for all four ACs. Accordingly, a STA is allowed to select a subset of the TIDs/ACs to which the EDCA Parameter Set for NSEP service will apply.

In a second option, the specification rules only allows the NSEP service for the selected TIDs/ACs. The other TIDs/ACs will use the backoff parameters of the normal EDCA parameter set.

In a third option, the NSEP service is provided to all ACs of a STA (MLD) whose NESP service is granted.

During NSEP Service Negotiation, in one embodiment the EDCA Parameter Set for NSEP service may announce the parameters for all four ACs, i.e., independent of specific STAs. During the NESP Service Negotiation, in another embodiment an AP (MLD) may accept a portion of the TIDs/ACs of a STA that will use the parameters in EDCA Parameter Set for NSEP. With this, one option is that different STAs have different TIDs/ACs that use the ESEP EDCA Parameter Set.

EDCA parameters for NSEP service are used to implement the QoS and to allow for NSEP priority access, even when the network is congested. Once the NSEP priority access service is enabled in a STA (MLD), the STA (MLD) uses NSEP EDCA Parameters to do the backoff. This will allow traffic from the STA (MLD) to gain access to the medium with higher priority. Then once the NSEP priority access service is disabled in a STA (MLD), the STA (MLD) uses the normal EDCA Parameters to do the backoff. This means that this traffic will use the normal EDCA parameters.

A trigger based mechanism is used to set up and allow multiuser (MU) operation. The use of MU EDCA Parameters for NSEP service after using a trigger-based mechanism for MU operation will now be described. After NSEP is enabled at a STA (MLD), the associated AP (MLD) may still schedule the STA (MLD) to transmit its frames through TB PPDU. Two different approaches for implementing MU EDCA priority access for NSEP during MU operation will be described. In a first approach, after transmitting TB PPDU, the normal MU EDCA Parameter Set is used for each STA (MLD) that enables NSEP service.

In a second approach, a new MU EDCA Parameter Set for NSEP service for each STA (MLD) is defined that enables the MU EDCA priority access for NSEP service on each STA (MLD). The MU EDCA parameters for NSEP service may be announced by the AP (MLD) through MU EDCA Parameter Set element for NSEP service (e.g. the current MU EDCA Parameter Set element or new defined NSEP MU EDCA Parameter Set element) to allow the STA (MLD) that enables NSEP service to use NSEP priority access after using TB PPDU to transmit its QoS Data frames. The rules for using MU EDCA Parameter Set for NSEP service is similar to the rules related to MU EDCA Parameter Set element. The format of MU NSEP EDCA Parameter Set element is similar to the format of MU EDCA Parameter Set element. MU EDCA Parameter Set element for NSEP service is link level information, i.e., the MU EDCA Parameter Set for NSEP service is defined for each link. The update of information in EDCA Parameter Set for NSEP service element may be carried out using a critical update.

The uses of TSPEC for NSEP STA (MLD) during MU operation or TXOP sharing operation will now be described. In order for an AP (MLD) to schedule the TB PPDU for a NSEP STA (MLD) to transmit NSEP data frames, the TSPEC with some modification, e.g. adding the life time of frame, delivery ratio etc., may be used.

The TSPEC may also be used for other purposes, such as for example, providing more information to allow AP (MLD) to decide whether the NSEP service is being enabled or not. For one example when the mean data rate of NSEP service is more than a value, the NSEP service is not enabled. The (updated) TSPEC may be carried in NSEP Priority Access Request/Response messages. Another option is to carry the TID in NSEP Priority Access Request/Response. In yet another option, the TSPEC with NSEP indication is carried in a stream classification service (SCS) Request/Response or add traffic stream (ADDTS) Request/Response exchanges. The response frame can do one of the following: accept the TSPEC with the modified TSPEC parameters; accept the request TSPEC; or reject the TSPEC with the advised TSPEC parameters.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An access point (AP) configured to support a high priority (HP) service, comprising:
    a transceiver configured to:
        announce first enhanced distributed channel access (EDCA) parameters for a first device associated with the AP, wherein the first EDCA parameters support the HP service;
        announce second EDCA parameters for a second device associated with the AP that does not support the HP service;
        receive a HP priority access request frame from the first device configured to request HP services; and transmit an HP priority access response frame to the first device enabling HP traffic transmission by the first device,
wherein the AP is a multi-link device (MLD), and wherein enabling HP traffic transmission by the first device is based upon a traffic specification (TSPEC) of a requested HP traffic such that when a mean data rate of a specific HP service is more than a value, the specific HP service is not enabled.

2. The AP of claim 1, wherein:
the first EDCA parameters include AIFSN, CWmin, and CWmax values.

3. The AP of claim 1, wherein the TSPEC is carried in a stream classification service (SCS) request/response exchange.

4. The AP of claim 1, wherein the TSPEC is carried in an add traffic stream (ADDTS) request/response exchange.

5. The AP of claim 1, wherein announcing the first EDCA parameters is done using a broadcast management frame from of the AP.

6. The AP of claim 1, wherein announcing the first EDCA parameters is done using a management frame for HP service enabling negotiation.

7. The AP of claim 1, wherein announcing the first EDCA parameters includes providing different EDCA parameters for each link associated with the first device.

8. The AP of claim 1, wherein the transceiver is further configured to update the first EDCA parameters for the first device.

9. The AP of claim 1, wherein the first EDCA parameters include EDCA parameters for a portion of the traffic IDs (TID)/access categories (AC) associated with the first device.

10. The AP of claim 1, wherein the first EDCA parameters include EDCA parameters for all of the traffic IDs (TID)/access categories (AC) associated with the first device, and wherein the first device determines which of the TIDs/ACs associated with the first device use the first EDCA parameters.

11. The AP of claim 1, wherein the HP service is enabled on all of the TIDs of the first device when the HP service is enabled for the first device.

12. The AP of claim 1, wherein the first EDCA parameters comprise a multiuser (MU) EDCA parameter set.

13. The AP of claim 12, wherein the MU EDCA parameter set is specified for each link associated with the first device.

14. The AP of claim 12, wherein the MU EDCA parameter set only applies to the AC_VI and AC_VO access categories, which correspond to video and voice traffic categories respectively.

15. A non-access point (non-AP) device configured to support a high priority (HP) service, comprising:
a transceiver configured to:
receive an announcement of first enhanced distributed channel access (EDCA) parameters from an access point (AP), wherein the first EDCA parameters support the HP service;
receive an announcement of a second enhanced distributed channel access (EDCA) parameters from the AP, wherein the second EDCA parameters do not support the HP service;
transmit a HP priority access request frame to the AP configured to request HP services; and
receive an HP priority access response frame from the AP enabling HP traffic transmission by the non-AP device,
wherein the AP is a multi-link device (MLD), and wherein enabling HP traffic transmission by the non-AP device is based upon a traffic specification (TSPEC) of a requested HP traffic such that when a mean data rate of a specific HP service is more than a value, the specific HP service is not enabled.

16. The non-AP device of claim 15, wherein:
the first and second EDCA parameters include AIFSN, CWmin, and CWmax values.

17. The non-AP device of claim 15, wherein the TSPEC is carried in a stream classification service (SCS) request/response exchange.

18. The non-AP device of claim 15, wherein the TSPEC is carried in an add traffic stream (ADDTS) request/response exchange.

19. The non-AP device of claim 15, wherein the transceiver is further configured to receive a broadcast management frame from the AP that announced the first EDCA parameters.

20. The non-AP device of claim 15, wherein announcing the first EDCA parameters is done using a management frame for HP service enabling negotiation.

21. The non-AP device of claim 15, wherein announcing the first EDCA parameters includes receiving different EDCA parameters for each link associated with the non-AP device.

22. The non-AP device of claim 15, wherein the transceiver is further configured to receive an update of the first EDCA parameters from the AP.

23. The non-AP device of claim 15, wherein the first EDCA parameters include EDCA parameters for a portion of the traffic IDs (TID)/access categories (AC) associated with the non-AP device.

24. The non-AP device of claim 15, wherein the first EDCA parameters include EDCA parameters for all of the traffic IDs (TID)/access categories (AC) associated with the non-AP device, and wherein the transceiver is further configured to determine which of the TIDs/ACs associated with the non-AP device use the first EDCA parameters.

25. The non-AP device of claim 15, wherein the HP service is enabled on all of the TIDs of the non-AP device when the HP service is enabled for the non-AP device.

26. The non-AP device of claim 15, wherein the first EDCA parameters comprise a multiuser (MU) EDCA parameter set.

27. The non-AP device of claim 26, wherein the MU EDCA parameter set is specified for each link associated with the non-AP device.

28. The non-AP of claim 26, wherein the MU EDCA parameter set only applies to the AC_VI and AC_VO access categories, which correspond to video and voice traffic categories respectively.

* * * * *